US009621575B1

(12) United States Patent
Jalan et al.

(10) Patent No.: US 9,621,575 B1
(45) Date of Patent: Apr. 11, 2017

(54) CONTEXT AWARE THREAT PROTECTION

(71) Applicant: A10 Networks, Inc., San Jose, CA (US)

(72) Inventors: Rajkumar Jalan, Saratoga, CA (US); Vernon Richard Groves, Seattle, WA (US)

(73) Assignee: A10 Networks, Inc., San Jose, CA (US)

( * ) Notice: Subject to any disclaimer, the term of this patent is extended or adjusted under 35 U.S.C. 154(b) by 5 days.

(21) Appl. No.: 14/584,987

(22) Filed: Dec. 29, 2014

(51) Int. Cl.
H04L 29/06 (2006.01)

(52) U.S. Cl.
CPC .......... *H04L 63/1441* (2013.01); *H04L 63/20* (2013.01)

(58) Field of Classification Search
CPC .................... H04L 63/20; H04L 63/1441
See application file for complete search history.

(56) References Cited

U.S. PATENT DOCUMENTS

| | | |
|---|---|---|
| 4,001,819 A | 1/1977 | Wise |
| 4,780,905 A | 10/1988 | Cruts et al. |
| 5,101,402 A | 3/1992 | Chiu et al. |
| 5,163,088 A | 11/1992 | LoCascio |
| 5,359,659 A | 10/1994 | Rosenthal |
| 5,414,833 A | 5/1995 | Hershey et al. |
| 5,584,023 A | 12/1996 | Hsu |
| 5,684,875 A | 11/1997 | Ellenberger |
| 5,757,908 A | 5/1998 | Cooper et al. |
| 5,940,002 A | 8/1999 | Finn et al. |
| 5,960,177 A | 9/1999 | Tanno |
| 6,088,804 A | 7/2000 | Hill et al. |
| 6,119,236 A | 9/2000 | Shipley |
| 6,185,681 B1 | 2/2001 | Zizzi |
| 6,205,115 B1 | 3/2001 | Ikebe et al. |
| 6,237,036 B1 | 5/2001 | Ueno et al. |

(Continued)

FOREIGN PATENT DOCUMENTS

| | | |
|---|---|---|
| CN | 1422468 A | 6/2003 |
| CN | 104106241 A | 10/2014 |

(Continued)

OTHER PUBLICATIONS

Dainotti, Albert et al. TIE: A Community-Oriented Traffic Classification Platform. May 11, 2009. Springer-Verlag, Traffic Monitoring and Analysis: Proceedings First International Workshop, TMA 2009. pp. 64-74. Retrieved from: Inspec. Accession No. 11061142.

(Continued)

*Primary Examiner* — Hadi Armouche
*Assistant Examiner* — Sher A Khan
(74) *Attorney, Agent, or Firm* — Carr & Ferrell LLP

(57) ABSTRACT

Methods and systems for dynamic threat protection are disclosed. An example method for dynamic threat protection may commence with receiving real-time contextual data from at least one data source associated with a client. The method may further include analyzing the real-time contextual data to determine a security threat score associated with the client. The method may continue with assigning, based on the analysis, the security threat score to the client. The method may further include automatically applying a security policy to the client. The security policy may be applied based on the security threat score assigned to the client.

18 Claims, 8 Drawing Sheets

(56) References Cited

U.S. PATENT DOCUMENTS

| | | |
|---|---|---|
| 6,249,866 B1 | 6/2001 | Brundrett et al. |
| 6,259,789 B1 | 7/2001 | Paone |
| 6,304,975 B1 | 10/2001 | Shipley |
| 6,324,286 B1 | 11/2001 | Lai et al. |
| 6,347,376 B1 | 2/2002 | Attwood et al. |
| 6,363,486 B1 | 3/2002 | Knapton, III |
| 6,449,651 B1 | 9/2002 | Dorfman et al. |
| 6,505,192 B1 | 1/2003 | Godwin et al. |
| 6,519,703 B1 | 2/2003 | Joyce |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,988,106 B2 | 1/2006 | Enderwick et al. |
| 7,092,357 B1 | 8/2006 | Ye |
| 7,159,237 B2 | 1/2007 | Schneier et al. |
| 7,194,766 B2 | 3/2007 | Noehring et al. |
| 7,200,760 B2 | 4/2007 | Riebe et al. |
| 7,221,757 B2 | 5/2007 | Alao |
| 7,222,366 B2 | 5/2007 | Bruton, III et al. |
| 7,296,283 B2 | 11/2007 | Hrastar et al. |
| 7,372,809 B2 | 5/2008 | Chen et al. |
| 7,392,241 B2 | 6/2008 | Lin et al. |
| 7,409,712 B1 | 8/2008 | Brooks et al. |
| 7,418,733 B2* | 8/2008 | Connary ............... H04L 43/045 709/224 |
| 7,543,052 B1 | 6/2009 | Cesa Klein |
| 7,565,549 B2 | 7/2009 | Satterlee et al. |
| 7,577,833 B2 | 8/2009 | Lai |
| 7,596,695 B2 | 9/2009 | Liao et al. |
| 7,620,733 B1 | 11/2009 | Tzakikario et al. |
| 7,640,591 B1 | 12/2009 | Tripathi et al. |
| 7,653,633 B2 | 1/2010 | Villella et al. |
| 7,665,138 B2 | 2/2010 | Song et al. |
| 7,739,494 B1 | 6/2010 | McCorkendale et al. |
| 7,739,736 B1 | 6/2010 | Tripathi et al. |
| 7,809,131 B1 | 10/2010 | Njemanze et al. |
| 7,895,649 B1 | 2/2011 | Brook et al. |
| 7,925,766 B2 | 4/2011 | Jayawardena et al. |
| 7,953,855 B2 | 5/2011 | Jayawardena et al. |
| 8,037,532 B2 | 10/2011 | Haswell |
| 8,089,871 B2 | 1/2012 | Iloglu et al. |
| 8,220,056 B2* | 7/2012 | Owens, Jr. ............... H04L 63/20 726/22 |
| 8,239,670 B1 | 8/2012 | Kaufman et al. |
| 8,276,203 B2 | 9/2012 | Nakhre et al. |
| 8,286,227 B1 | 10/2012 | Zheng |
| 8,289,981 B1 | 10/2012 | Wei et al. |
| 8,301,802 B2 | 10/2012 | Wei et al. |
| 8,448,245 B2* | 5/2013 | Banerjee ................. G06F 21/51 709/224 |
| 8,478,708 B1* | 7/2013 | Larcom ................. G06Q 10/10 706/52 |
| 8,595,845 B2* | 11/2013 | Basavapatna ......... G06F 21/577 705/38 |
| 8,719,446 B2 | 5/2014 | Spatscheck et al. |
| 8,800,034 B2* | 8/2014 | McHugh ............... G06F 21/577 726/22 |
| 8,813,228 B2* | 8/2014 | Magee ................. G06F 21/577 713/187 |
| 8,832,832 B1* | 9/2014 | Visbal ................. H04L 63/1441 726/22 |
| 8,881,284 B1 | 11/2014 | Gabriel |
| 8,948,380 B2 | 2/2015 | Goto |
| 9,129,116 B1 | 9/2015 | Wiltzius |
| 9,215,208 B2* | 12/2015 | Fraize ................. H04L 63/0227 |
| 9,245,121 B1 | 1/2016 | Luo et al. |
| 9,294,503 B2 | 3/2016 | Thompson et al. |
| 9,300,623 B1 | 3/2016 | Earl et al. |
| 2001/0042204 A1 | 11/2001 | Blaker et al. |
| 2002/0087708 A1 | 7/2002 | Low et al. |
| 2002/0108059 A1 | 8/2002 | Canion et al. |
| 2002/0165912 A1 | 11/2002 | Wenocur et al. |
| 2002/0188839 A1 | 12/2002 | Noehring et al. |
| 2003/0023846 A1 | 1/2003 | Krishna et al. |
| 2003/0028585 A1 | 2/2003 | Yeager et al. |
| 2003/0061507 A1 | 3/2003 | Xiong et al. |
| 2003/0069973 A1 | 4/2003 | Ganesan et al. |
| 2003/0123667 A1 | 7/2003 | Weber et al. |
| 2003/0187688 A1* | 10/2003 | Fey ....................... G06F 19/321 705/2 |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0057579 A1 | 3/2004 | Fahrny |
| 2004/0059943 A1 | 3/2004 | Marquet et al. |
| 2004/0059951 A1 | 3/2004 | Pinkas et al. |
| 2004/0059952 A1 | 3/2004 | Newport et al. |
| 2004/0091114 A1 | 5/2004 | Carter et al. |
| 2004/0093524 A1 | 5/2004 | Sakai |
| 2004/0111635 A1 | 6/2004 | Boivie et al. |
| 2004/0143751 A1 | 7/2004 | Peikari |
| 2004/0148520 A1 | 7/2004 | Talpade et al. |
| 2004/0172538 A1 | 9/2004 | Satoh et al. |
| 2004/0242200 A1 | 12/2004 | Maeoka et al. |
| 2005/0021999 A1 | 1/2005 | Touitou et al. |
| 2005/0036501 A1 | 2/2005 | Chung et al. |
| 2005/0041584 A1 | 2/2005 | Lau et al. |
| 2005/0044068 A1 | 2/2005 | Lin et al. |
| 2005/0044270 A1 | 2/2005 | Grove et al. |
| 2005/0044352 A1 | 2/2005 | Pazi et al. |
| 2005/0108434 A1 | 5/2005 | Witchey |
| 2005/0125684 A1 | 6/2005 | Schmidt |
| 2005/0180416 A1 | 8/2005 | Jayawardena et al. |
| 2005/0193199 A1 | 9/2005 | Asokan et al. |
| 2005/0198099 A1 | 9/2005 | Motsinger et al. |
| 2005/0210243 A1 | 9/2005 | Archard et al. |
| 2005/0235145 A1 | 10/2005 | Slick et al. |
| 2005/0257093 A1 | 11/2005 | Johnson et al. |
| 2005/0278527 A1 | 12/2005 | Liao et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0185014 A1 | 8/2006 | Spatscheck et al. |
| 2006/0206936 A1 | 9/2006 | Liang et al. |
| 2006/0230444 A1 | 10/2006 | Iloglu et al. |
| 2006/0251057 A1 | 11/2006 | Kwon et al. |
| 2006/0253902 A1 | 11/2006 | Rabadan et al. |
| 2006/0256716 A1 | 11/2006 | Caci |
| 2006/0265585 A1 | 11/2006 | Lai |
| 2006/0288411 A1 | 12/2006 | Garg et al. |
| 2007/0056038 A1 | 3/2007 | Lok |
| 2007/0143769 A1 | 6/2007 | Bu et al. |
| 2007/0169194 A1 | 7/2007 | Church et al. |
| 2007/0186282 A1 | 8/2007 | Jenkins |
| 2007/0214088 A1 | 9/2007 | Graham et al. |
| 2007/0280114 A1 | 12/2007 | Chao et al. |
| 2007/0291773 A1* | 12/2007 | Khan ..................... G06F 9/505 370/401 |
| 2008/0183885 A1 | 7/2008 | Durrey et al. |
| 2008/0229418 A1* | 9/2008 | Chen ..................... G06F 21/552 726/23 |
| 2008/0256623 A1 | 10/2008 | Worley et al. |
| 2009/0049198 A1 | 2/2009 | Blinn et al. |
| 2009/0070470 A1 | 3/2009 | Bauman et al. |
| 2009/0077663 A1 | 3/2009 | Sun et al. |
| 2009/0083537 A1 | 3/2009 | Larsen et al. |
| 2009/0150996 A1 | 6/2009 | Haswell |
| 2009/0168995 A1 | 7/2009 | Banga et al. |
| 2009/0227228 A1 | 9/2009 | Hu et al. |
| 2009/0241190 A1 | 9/2009 | Todd et al. |
| 2009/0287941 A1 | 11/2009 | Shouno |
| 2010/0106833 A1 | 4/2010 | Banerjee et al. |
| 2010/0138921 A1 | 6/2010 | Na et al. |
| 2010/0284300 A1 | 11/2010 | Deshpande et al. |
| 2010/0286998 A1* | 11/2010 | Picken ................. G06Q 50/22 705/2 |
| 2011/0029599 A1 | 2/2011 | Pulleyn et al. |
| 2011/0082947 A1 | 4/2011 | Szeto et al. |

(56) References Cited

U.S. PATENT DOCUMENTS

| | | |
|---|---|---|
| 2011/0093785 A1 | 4/2011 | Lee et al. |
| 2011/0131646 A1 | 6/2011 | Park et al. |
| 2011/0153744 A1* | 6/2011 | Brown ............. G06F 17/30731 709/204 |
| 2011/0188452 A1 | 8/2011 | Borleske et al. |
| 2011/0249572 A1 | 10/2011 | Singhal et al. |
| 2011/0282997 A1 | 11/2011 | Prince et al. |
| 2012/0036272 A1 | 2/2012 | El Zur |
| 2012/0042060 A1 | 2/2012 | Jackowski et al. |
| 2012/0096546 A1 | 4/2012 | Dilley et al. |
| 2012/0110472 A1 | 5/2012 | Amrhein et al. |
| 2012/0144461 A1 | 6/2012 | Rathbun |
| 2012/0155274 A1 | 6/2012 | Wang et al. |
| 2012/0159623 A1 | 6/2012 | Choi |
| 2012/0163186 A1 | 6/2012 | Wei et al. |
| 2012/0173684 A1 | 7/2012 | Courtney et al. |
| 2012/0174196 A1 | 7/2012 | Bhogavilli et al. |
| 2012/0226582 A1* | 9/2012 | Hammad ............. G06F 21/34 705/26.41 |
| 2012/0227109 A1 | 9/2012 | Dimuro |
| 2012/0266242 A1 | 10/2012 | Yang et al. |
| 2013/0019025 A1 | 1/2013 | Chaturvedi et al. |
| 2013/0124713 A1 | 5/2013 | Feinberg et al. |
| 2013/0139245 A1* | 5/2013 | Thomas ............. H04L 63/0227 726/13 |
| 2013/0173795 A1 | 7/2013 | McPherson |
| 2013/0198385 A1 | 8/2013 | Han et al. |
| 2013/0198845 A1 | 8/2013 | Anvari |
| 2013/0212265 A1 | 8/2013 | Rubio Vidales et al. |
| 2013/0243194 A1 | 9/2013 | Hawkes et al. |
| 2013/0263256 A1 | 10/2013 | Dickinson et al. |
| 2014/0006508 A1* | 1/2014 | Goyet .................. H04L 67/22 709/204 |
| 2014/0025568 A1* | 1/2014 | Smith .................. G06Q 10/00 705/39 |
| 2014/0137190 A1* | 5/2014 | Carey ................ H04L 63/1433 726/3 |
| 2014/0258536 A1 | 9/2014 | Chiong |
| 2014/0269308 A1 | 9/2014 | Oshiba |
| 2014/0280832 A1 | 9/2014 | Oshiba |
| 2014/0283065 A1* | 9/2014 | Teddy .................. H04L 63/145 726/23 |
| 2014/0298091 A1 | 10/2014 | Carlen et al. |
| 2014/0310396 A1 | 10/2014 | Christodorescu et al. |
| 2014/0325588 A1 | 10/2014 | Jalan et al. |
| 2014/0344925 A1 | 11/2014 | Muthiah |
| 2015/0033341 A1* | 1/2015 | Schmidtler ............. H04L 63/14 726/23 |
| 2015/0058977 A1 | 2/2015 | Thompson et al. |
| 2015/0088597 A1* | 3/2015 | Doherty ............. G06Q 10/0635 705/7.28 |
| 2015/0143118 A1 | 5/2015 | Sheller et al. |
| 2015/0312268 A1 | 10/2015 | Ray |
| 2015/0333988 A1 | 11/2015 | Jalan et al. |
| 2016/0036651 A1 | 2/2016 | Sureshchandra et al. |
| 2016/0134655 A1 | 5/2016 | Thompson et al. |

FOREIGN PATENT DOCUMENTS

| | | |
|---|---|---|
| HK | 1198848 A | 6/2015 |
| TW | 375721 | 12/1999 |
| TW | 477140 | 2/2002 |
| TW | 574655 | 2/2004 |
| TW | NI197237 | 2/2004 |
| TW | I225999 | 1/2005 |
| TW | I241818 | 10/2005 |
| TW | I252976 | 4/2006 |
| WO | WO9842108 | 9/1998 |
| WO | WO2006039529 | 4/2006 |
| WO | WO2013112492 A1 | 8/2013 |
| WO | WO2014150617 | 9/2014 |
| WO | WO2014151072 | 9/2014 |
| WO | WO2014176461 | 10/2014 |
| WO | WO2015030977 | 3/2015 |

OTHER PUBLICATIONS

ORACLE Corporation. Oracle Intelligent Agent User's Guide, Release 9.2.0, Part No. A96676-01. Mar. 2002.

SOL11243. iRules containing the RULE_INIT iRule event do not re-initialize when a syntax error is corrected. f5. support.com. May 24, 2010.

Mutz, "Linux Encryption How To," available at http://encryptionhowto.sourceforge.net/Encryption-HOWTO-1.html, Oct. 4, 2000.

Ganesan et al., "YAPPERS: A peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007.

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979.

Lee et al., "On the Detection of Signaling DoS Attacks on 3G Wireless Networks," IEEE INFOCOM 2007 processings, pp. 1289-1297.

"How to Create a Rule in Outlook 2003" CreateaRule-Outlook2003.doc 031405 mad, 3 pages.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Liebergeld, Steffen et al., "Cellpot: A Concept for Next Generation Cellular Network Honeypots," Internet Society, Feb. 23, 2014, pp. 1-6.

\* cited by examiner

Real-time Contextual Data
500

- Authentication Data
- Internet Protocol Data
- Wireless Roaming Data
- Network Path Data
- Payment Data
- Account Data
- Operating System Data
- Virus Scan Data
- Session Data
- Client Data
- Client Location Data
- Session Encryption Data
- Client Network Data
- Client Reputation Data

FIG. 5

CONTEXT AWARE THREAT PROTECTION

TECHNICAL FIELD

This disclosure relates generally to data processing, and more specifically, to dynamic threat protection in a data network.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Within a modern threat protection system, a policy can be defined using Internet Protocol (IP) addresses to identify nodes to protect or block, or nodes against which a further policy can be executed. In general, the basis for the protection policy is defined statically by a user and then manually applied. The challenge, however, is that because service providing systems are dynamic with the state of services, clients, and servers in constant flux and, therefore, static policies can only be effective for a short period of time. Events within a service providing system can constantly change the state of the service providing system. User authentication, changes in reputation, mobile device roaming, and IP address lease expiration are all examples of events which negate the usefulness of a static policy.

As static policies lose their relevance, threat protection systems attempt to automatically ascertain the correct policy through active challenges and passive observation of flows. However, selecting the correct policy is a resource-intensive process that amounts to marginally effective "guess work" by the threat protection systems.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for a dynamic threat protection. Specifically, a method for a dynamic threat protection may commence with receiving real-time contextual data from at least one data source associated with a client. The method may further include analyzing the real-time contextual data to determine a security threat score associated with the client. The method may continue with assigning, based on the analysis, the security threat score to the client. The method may further include automatically applying a security policy to the client.

According to another approach of the present disclosure, there is provided a dynamic threat protection system. The system may include at least one data source, an analyzing module, an assignment module, and a mitigation device. The data source may be operable to provide real-time contextual data associated with a client. The analyzing module may be operable to analyze the real-time contextual data. Based on the analysis, a security threat score associated with the client can be determined. The assignment module may be operable to assign, based on the analysis, the security threat score to the client. Upon assigning the security threat score to the client, the mitigation device may automatically apply, based on the security threat score, a security policy to the client.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings.

FIG. 5 is a block diagram showing example real-time contextual data.

DETAILED DESCRIPTION

Figure 1:
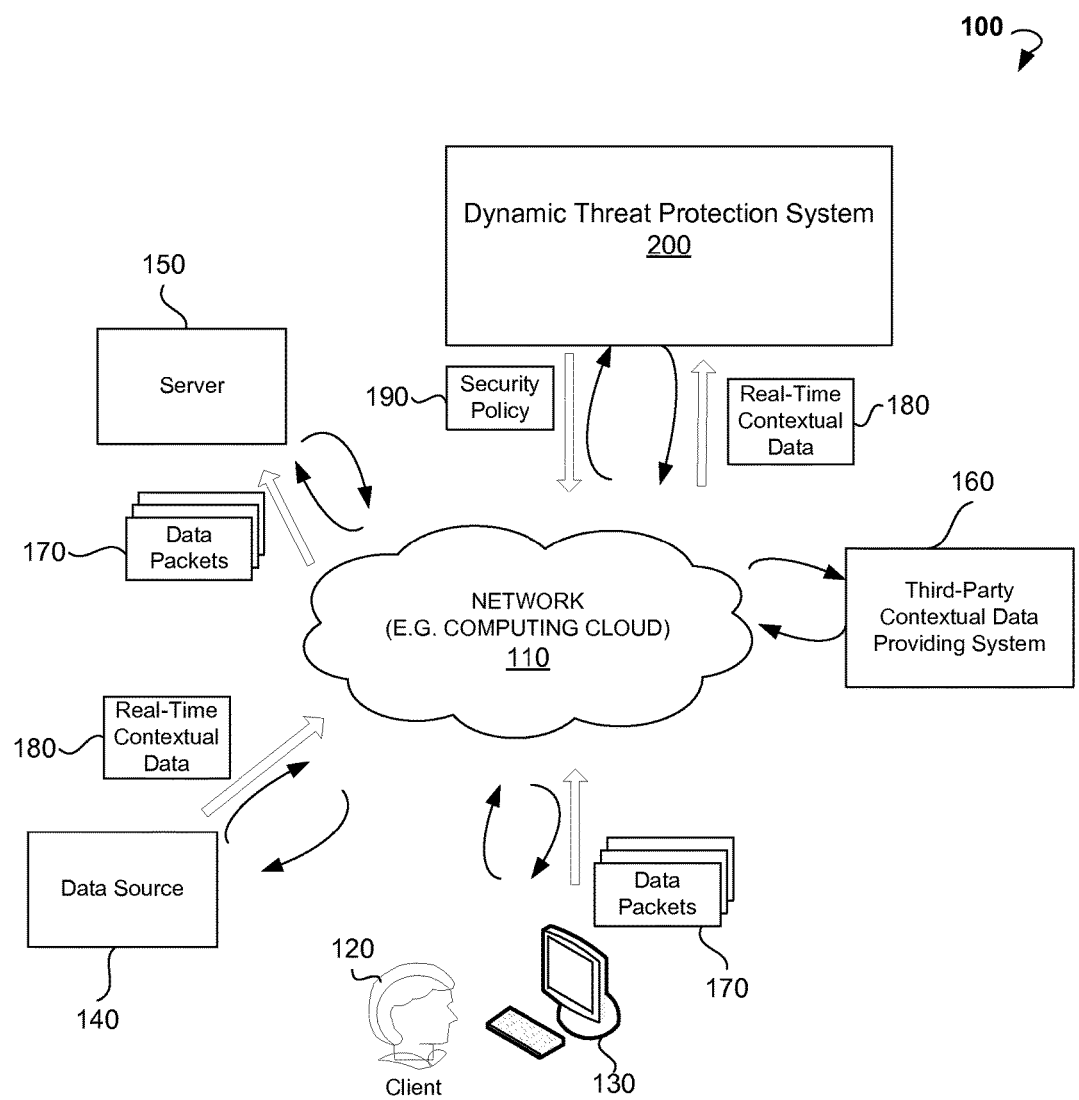
FIG. 1 is a block diagram showing an environment within which methods for dynamic threat protection can be practiced.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), a game console, a handheld gaming device, a cellular phone, a smart phone, a smart television system, and so forth.

The present disclosure relates to methods and systems for dynamic threat protection. According to an example method, a client can send a service request to a server in a data network. The service request may include one or more data packets. The client may be associated with a data source operable to collect real-time contextual data associated with the client. In particular, the data source may include a hardware node or a software node in the data network and may be in communication with the client. The data source may be operable to provide the real-time contextual data associated with the client to a dynamic threat protection system.

The dynamic threat protection system may be operable to select and apply a security policy with regard to a specific client. To this effect, the dynamic threat protection system may have a real-time understanding of the client-specific contextual data received from the data sources. The dynamic threat protection system may receive the service request from the client. Upon receiving the service request, the dynamic threat protection system may retrieve the real-time contextual data of the client from the data source associated with the client. Alternatively, the real-time contextual data may be retrieved from the service request received from the client. The real-time contextual data may include authenticated user data, IP address renewal, wireless roaming information, network path, updated payment information, age of an account, and the like.

Based on the real-time contextual data, the dynamic threat protection system may assign a security threat score to the client. The assigned security threat score may be used by the dynamic threat protection system to select and apply a specific security policy to the client. More specifically, by receiving the real-time contextual data, the dynamic threat protection system may update "on the fly" the security policy with respect to a specific client. Additionally, a common event bus may be created to group many disparate data sources associated with the clients to allow the dynamic threat protection system to apply the most relevant update to any particular security policy.

Referring now to the drawings, FIG. 1 shows an environment 100 within which methods for dynamic threat protection can be practiced. The environment 100 may include a network 110, a client 120, a client device 130 associated with the client 120, a data source 140, a server 150, a dynamic threat protection system 200, and a third-party contextual data providing system 160. The data source 140 may be associated with the client 120 and may include a network resource, such as a network node, that collects real-time contextual data 180 associated with the client 120. The client 120 may perform a data service session with the server 150 by sending a service request including data packets 170 from the client device 130 to the server 150. The dynamic threat protection system 200 may receive the real-time contextual data 180 from the data source 140. Based on analysis of the received real-time contextual data 180, the dynamic threat protection system 200 may select a security policy 190 to be assigned to the client 120. The server 150 may process the data packets 170 of the client 120 based on the security policy 190. Alternatively, the dynamic threat protection system 200 may receive the real-time contextual data 180 associated with the client 120 from the third-party contextual data providing system 160.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (FireWire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication.

Figure 2:
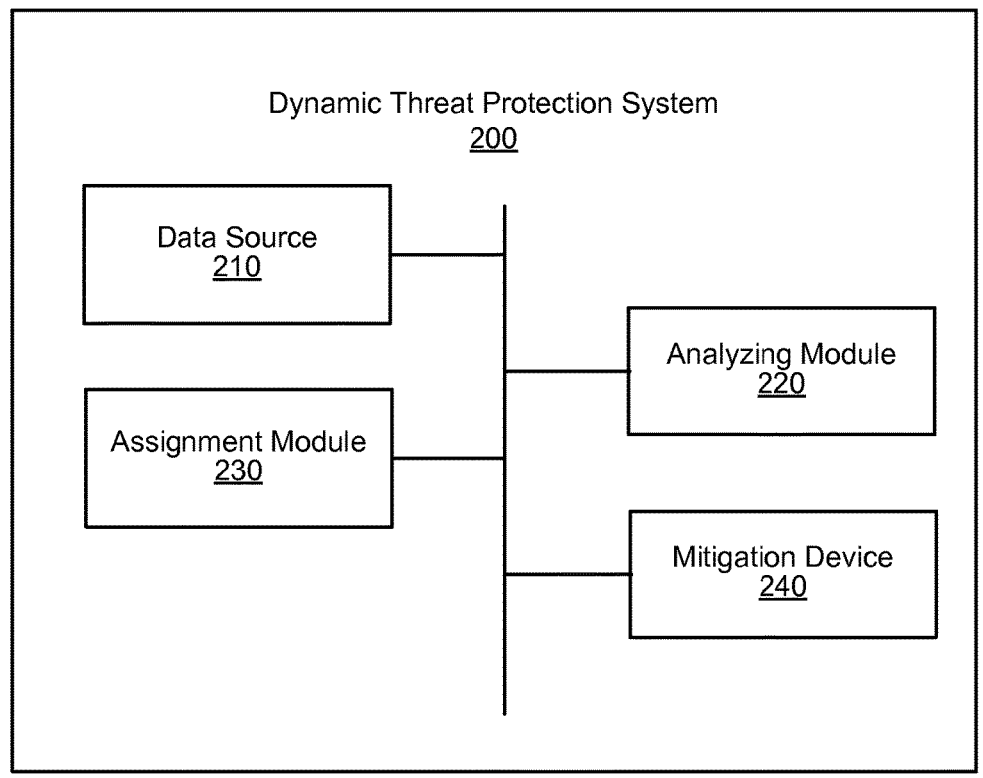
FIG. 2 is a block diagram of a dynamic threat protection system.

FIG. 2 is a block diagram representing components of a dynamic threat protection system 200, in accordance with certain embodiments. The system 200 may include at least one data source 210. The data source 210 may be operable to provide real-time contextual data associated with a client. In an example embodiment, the real-time contextual data may be received from the at least one data source via a common event bus. In a further example embodiment, the real-time contextual data may include at least one of the following: authentication data, IP data, wireless roaming data, network path data, payment data, account data, operating system data, virus scan data, session data, client data, client location data, session encryption data, client network data, and client reputation data. In further example embodiments, the real-time contextual data may be received from a third-party system. The real-time contextual data may be obtained from at least one data protocol of data communications with the client.

The system 200 may further include an analyzing module 220. The analyzing module 220 may be operable to analyze the real-time contextual data to determine a security threat score associated with the client. The system 200 may further include an assignment module 230. The assignment module may be operable to assign, based on the analysis performed by the analyzing module 220, the security threat score to the client.

The system 200 may further include a mitigation device 240. The mitigation device 240 may be operable to receive a service request from the client. The service request may include one or more data packets. The mitigation device 240 may be operable to automatically apply, based on the security threat score, a security policy to the client. Furthermore, based on the security threat score, a quality of service is provided to the client. In an example embodiment, the mitigation device 240 may be operable to determine whether the security threat score assigned to the client is above a predetermined threshold threat score. Based on the determination, the mitigation device 240 may be operable to selectively apply additional security measures to the client. The additional security measures may include analyzing contents of data packets associated with the client for adherence to a predetermined standard.

Figure 3:
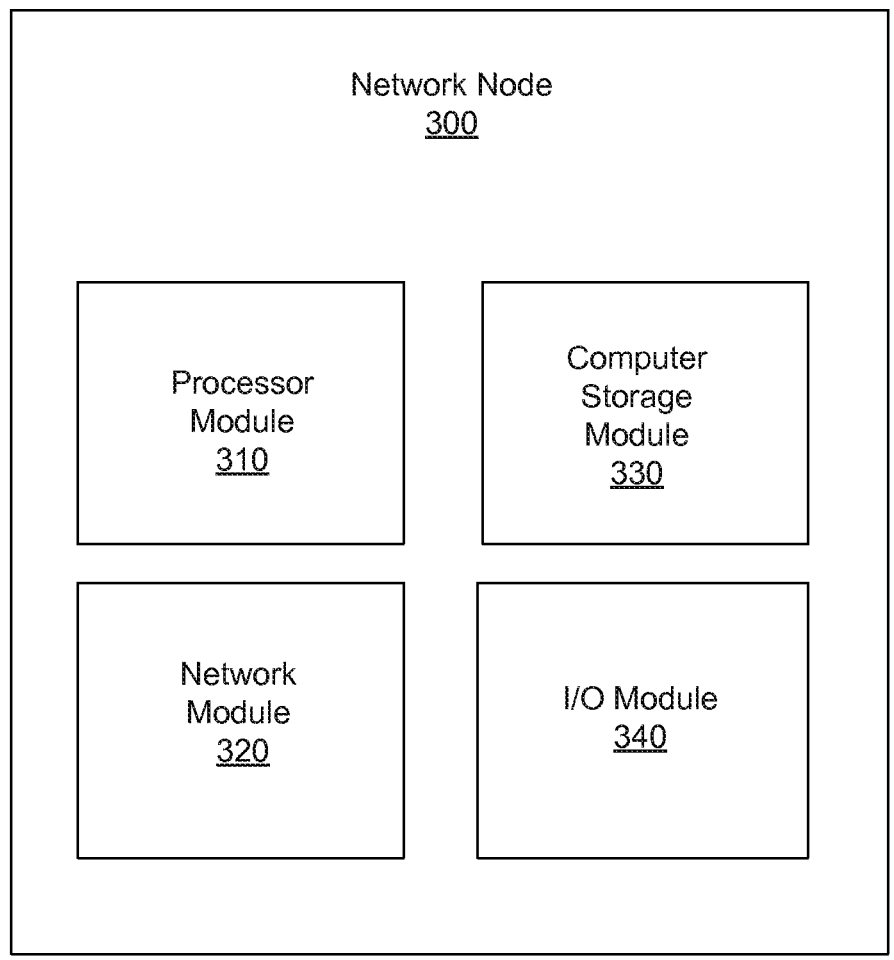
FIG. 3 is a block diagram illustrating components of a network node.

FIG. 3 illustrates an exemplary embodiment of a network node 300 of the data network. The network node can be a client device, a server, a data source, or other computing devices in the data network. In one embodiment, the network node 300 includes a processor module 310, a network module 320, and a computer storage module 330. In one embodiment, the processor module 310 includes one or more processors, which may be a micro-processor, an Intel processor, an AMD processor, a MIPS processor, an ARM-based processor, or a RISC processor. The processor module 310 may include one or more processor cores embedded in a processor. In an example embodiment, the processor module 310 includes one or more embedded processors, or embedded processing elements in a Field Programmable Gate Array (FPGA), an Application Specific Integrated Circuit (ASIC), or Digital Signal Processor (DSP).

The network module 320 may include a network interface, such as Ethernet, an optical network interface, a wireless network interface, T1/T3 interface, a WAN or LAN interface. In one embodiment, the network module 320 includes a network processor. In one embodiment, the computer storage module 330 includes RAM, DRAM, SRAM, SDRAM or memory utilized by the processor module 310 or the network module 320.

In one embodiment, the computer storage module 330 stores data utilized by processor module 310. In one embodiment, the computer storage module 330 includes a hard disk drive, a solid state drive, an external disk, a DVD, a CD, or a readable external disk. The computer storage module 330 may store one or more computer programming instructions which when executed by the processor module 310 or the network module 320 implement one or more of the functionalities of the present disclosure.

In one embodiment, the network node 300 further includes an input/output (I/O) module 340, which may include a keyboard, a keypad, a mouse, a gesture based input sensor, a microphone, a physical or sensory input peripheral, a display, a speaker, or a physical or sensual output peripheral.

Figure 4:
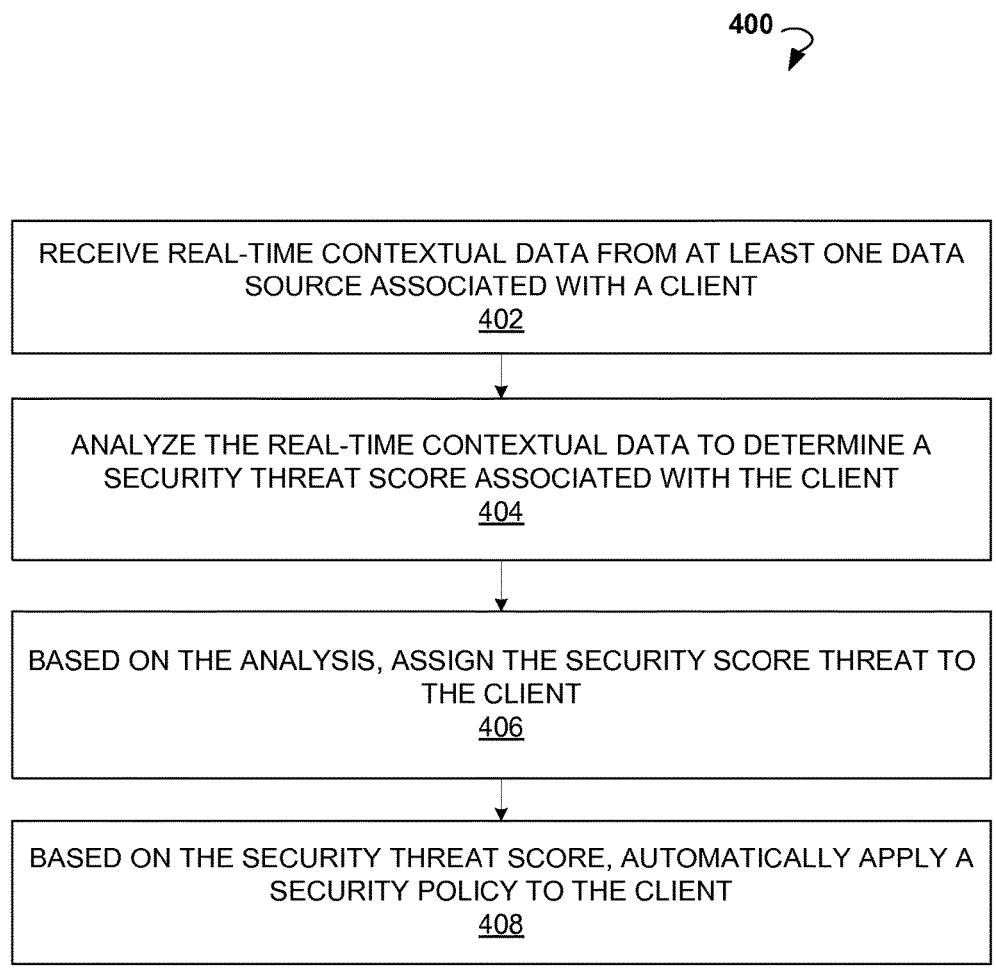
FIG. 4 is a process flow diagram illustrating a method for dynamic threat protection.

FIG. 4 illustrates a method 400 for a dynamic threat protection, according to an example embodiment. In some embodiments, the operations may be combined, performed in parallel, or performed in a different order. The method 400 may also include additional or fewer operations than those illustrated. The method 400 may be performed by processing logic that may comprise hardware (e.g., decision making logic, dedicated logic, programmable logic, and microcode), software (such as software run on a general-purpose computer system or a dedicated machine), or a combination of both.

The method 400 may commence with receiving, by at least one processor, real-time contextual data from at least one data source associated with a client at operation 402. The real-time contextual data may be received from the at least one data source via a common event bus. In an example embodiment, the real-time contextual data is received from a third-party system. In a further example embodiment, the real-time contextual data is obtained from at least one data protocol of data communications with the client. Optionally, the real-time contextual data may be received along with receiving a service request from the client. The service request may include one or more data packets.

FIG. 5 is a diagram illustrating real-time contextual data 500. The real-time contextual data 500 may include at least one of the following: authentication data, IP data, wireless roaming data, network path data, payment data, account data, operating system data, virus scan data, session data, client data, client location data, session encryption data, client network data, client reputation data, and so forth.

Referring back to FIG. 4, upon receiving the real-time contextual data, the method 400 may continue with analyzing the real-time contextual data at operation 404. The analysis is performed to determine a security threat score associated with the client. Based on the analysis, the security threat score may be assigned to the client at operation 406. At operation 408, the method 400 may include automatically applying, based on the security threat score, a security policy to the client. Upon applying the security policy to the client, the method 400 may further include providing a quality of service to the client based on the security threat score.

In an example embodiment, the method 400 may further include determining whether the security threat score assigned to the client is above a predetermined threshold threat score. Based on the determination, additional security measures may be selectively applied to the client. The additional security measures may include analyzing contents of the data packets associated with the client for adherence to a predetermined standard.

Figure 6:
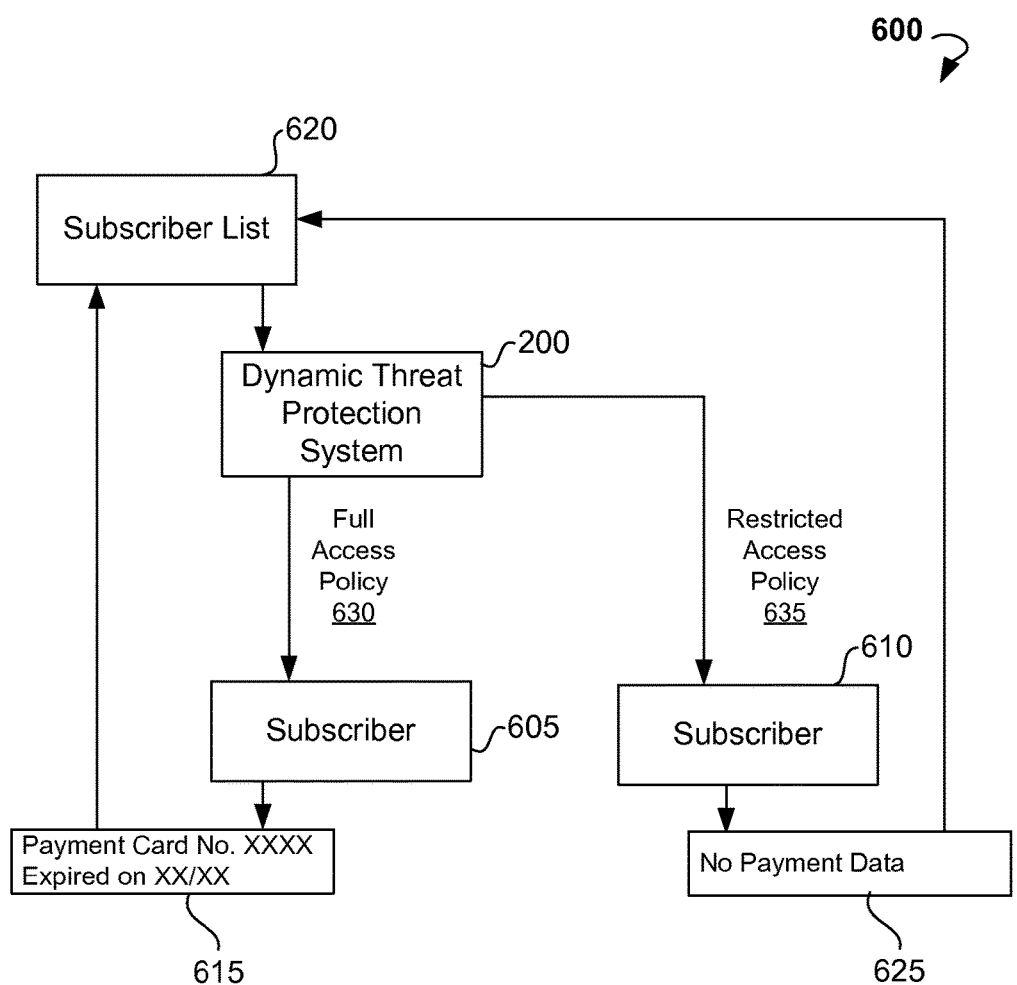
FIG. 6 is a block diagram illustrating application of a policy to subscribers in a service providing system.

FIG. 6 is a block diagram 600 illustrating applying policy to subscribers in a service providing system. The service providing system (not shown), such as, for example, a game providing system, may have a number of subscribers, shown as subscriber 605 and subscriber 610. The subscriber 605 and subscriber 610 may be requested to provide subscriber-specific information, such as subscriber payment data 615. The service providing system may collect and store the subscriber-specific information in a subscriber list 620. The subscriber list 620 may contain data related to authenticated subscribers, i.e. subscribers registered in the service providing system, and subscriber-specific information. The subscriber-specific information may further include operating system data, patch level data, the latest virus scan data, up time data, and so forth. In case the subscriber 610 does not enter the subscriber payment data, an indication 625 that no payment data is available for the subscriber 610 may be stored in the subscriber list 620.

The dynamic threat protection system 200 may be provided with the subscriber list 620 containing an updated list of authenticated subscribers 605, 610 with updated subscriber-specific information. Based on the provided subscriber-specific information, such as subscriber payment data 615 or indication 625 that no payment data is available for the subscriber 610, the dynamic threat protection system 200 may provide the subscriber 605 with preferential quality of service over the subscriber 610. For example, the subscriber 605 with valid payment data may be provided with a full access policy 630, while the subscriber 610 with no payment data may be provided with a restricted access policy 635. Therefore, using the subscriber-specific information, the dynamic threat protection system 200 may apply the security policy of extreme relevance to a specific subscriber.

Figure 7:
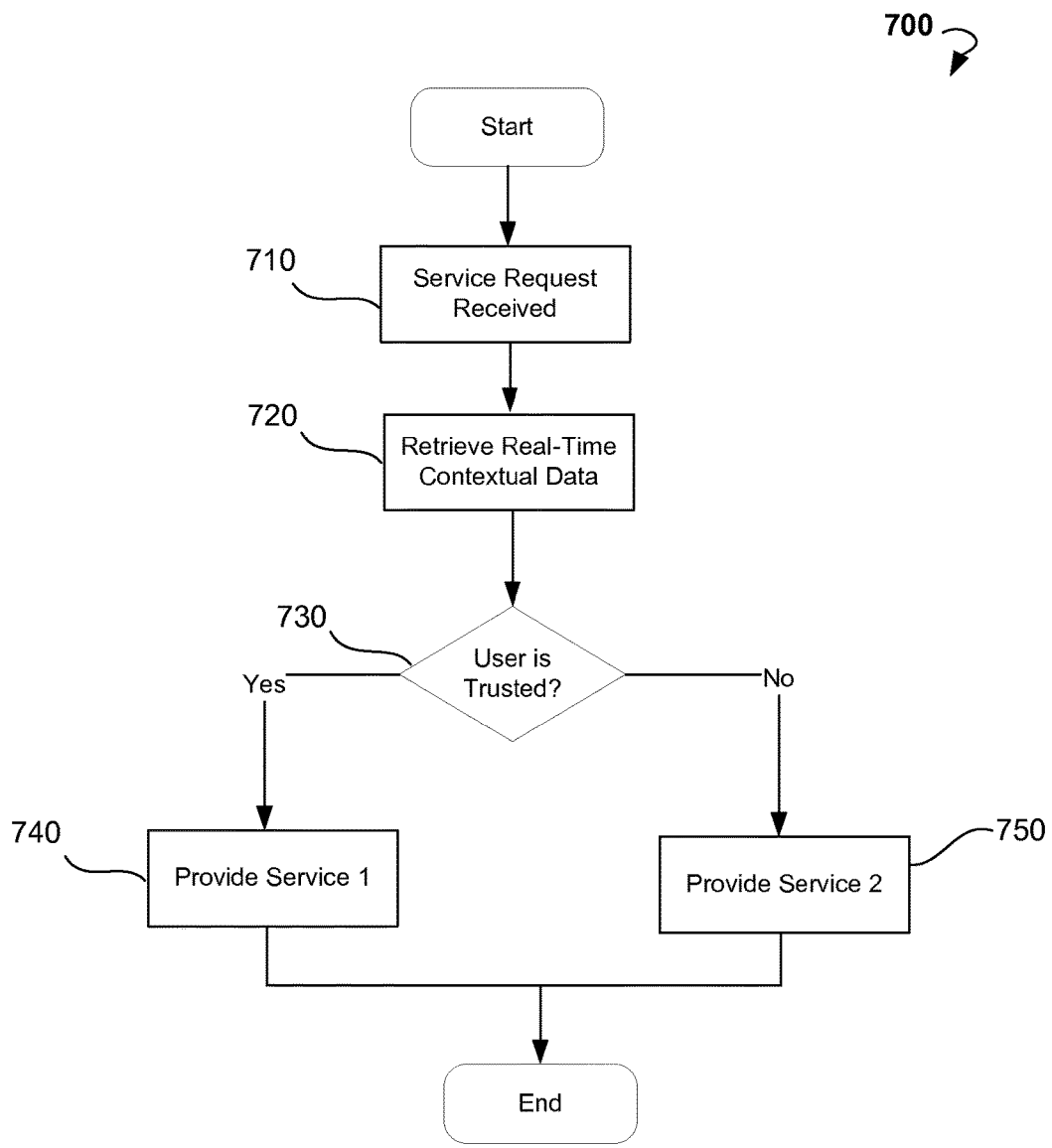
FIG. 7 is a flow diagram illustrating a method for providing a service in response to a service request.

FIG. 7 is a flow diagram 700 illustrating providing a service in response to a service request, according to an example embodiment. The dynamic threat protection system may receive a service request from a client at block 710. At block 720, the dynamic threat protection system may retrieve real-time contextual data associated with the client from the service request or from a data source associated with the client. The real-time contextual data is illustrated in detail with respect to FIG. 5. Upon retrieval of the real-time contextual data, the dynamic threat protection system may determine whether the client is trusted at block 730. The determination may be performed based on the analysis of the real-time contextual data to determine the security threat score of the client. In case the security threat score assigned to the client is above a predetermined threshold threat score, the client may be determined to be trusted. At block 740, a first type of service, e.g. unlimited service, may be provided to the trusted client. In case the security threat score assigned to the client is below a predetermined threshold threat score, the client may be determined to be untrusted. At block 750, a second type of service, e.g. limited service, may be provided to the untrusted client.

Figure 8:
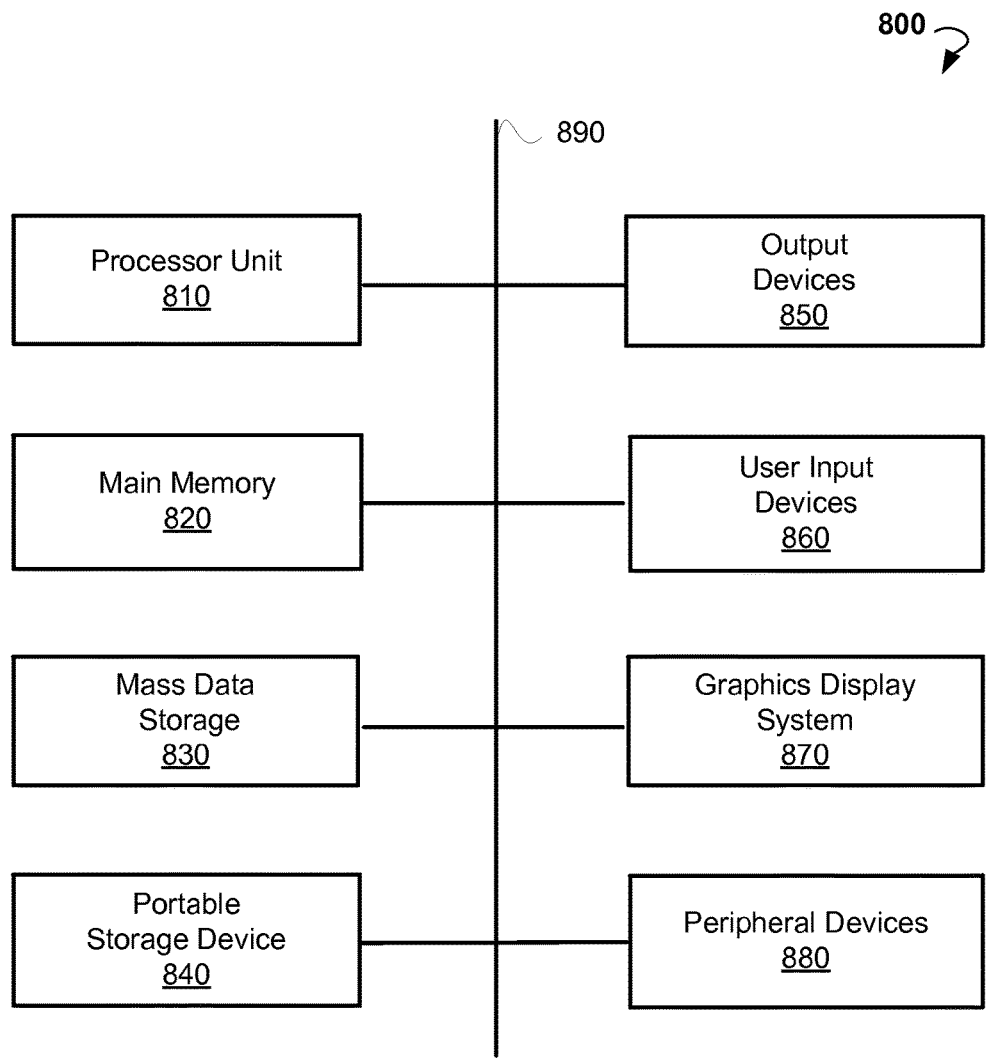
FIG. 8 shows a diagrammatic representation of a computing device for a machine, within which a set of instructions for causing the machine to perform any one or more of the methodologies discussed herein can be executed.

FIG. 8 illustrates an example computer system 800 that may be used to implement embodiments of the present disclosure. The system 800 of FIG. 8 can be implemented in the contexts of the likes of computing systems, networks, servers, or combinations thereof. The computing system 800 of FIG. 8 includes one or more processor units 810 and main memory 820. Main memory 820 stores, in part, instructions and data for execution by processor 810. Main memory 820 stores the executable code when in operation. The computer system 800 of FIG. 8 further includes a mass data storage 830, portable storage medium drive(s) 840, output devices 850, user input devices 860, a graphics display system 870, and peripheral devices 880. The methods may be implemented in software that is cloud-based.

The components shown in FIG. 8 are depicted as being connected via a single bus 890. The components may be connected through one or more data transport means. Processor unit 810 and main memory 820 is connected via a local microprocessor bus, and the mass data storage 830, peripheral device(s) 880, portable storage device 840, and graphics display system 870 are connected via one or more input/output (I/O) buses.

Mass data storage 830, which can be implemented with a magnetic disk drive, solid state drive, or an optical disk drive, is a non-volatile storage device for storing data and instructions for use by processor unit 810. Mass data storage 830 stores the system software for implementing embodiments of the present disclosure for purposes of loading that software into main memory 820.

Portable storage device 840 operates in conjunction with a portable non-volatile storage medium, such as a floppy disk, compact disc, digital video disc, or Universal Serial Bus (USB) storage device, to input and output data and code to and from the computer system 800 of FIG. 8. The system software for implementing embodiments of the present disclosure is stored on such a portable medium and input to the computer system 800 via the portable storage device 840.

User input devices 860 provide a portion of a user interface. User input devices 860 include one or more microphones, an alphanumeric keypad, such as a keyboard, for inputting alphanumeric and other information, or a pointing device, such as a mouse, a trackball, stylus, or cursor direction keys. User input devices 860 can also include a touchscreen. Additionally, the computer system 800 as shown in FIG. 8 includes output devices 850. Suitable output devices include speakers, printers, network interfaces, and monitors.

Graphics display system 870 includes a liquid crystal display (LCD) or other suitable display device. Graphics display system 870 receives textual and graphical information and processes the information for output to the display device.

Peripheral devices 880 may include any type of computer support device to add additional functionality to the computer system.

The components provided in the computer system 800 of FIG. 8 are those typically found in computer systems that may be suitable for use with embodiments of the present disclosure and are intended to represent a broad category of such computer components that are well known in the art. Thus, the computer system 800 of FIG. 8 can be a personal computer (PC), hand held computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used, including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media, such as optical or magnetic disks and dynamic memory, respectively. Common forms of computer-readable storage media include a floppy disk, a flexible disk, a hard disk, magnetic tape, any other magnetic storage medium, a Compact Disc Read Only Memory (CD-ROM) disk, digital video disc (DVD), Blu-ray Disc (BD), any other optical storage medium, Random-Access Memory (RAM), Programmable Read-Only Memory (PROM), Erasable Programmable Read-Only Memory (EPROM), Electronically Erasable Programmable Read Only Memory (EEPROM), flash memory, and/or any other memory chip, module, or cartridge.

In some embodiments, the computer system 800 may be implemented as a cloud-based computing environment, such as a virtual machine operating within a computing cloud. In other embodiments, the computer system 800 may itself include a cloud-based computing environment, where the functionalities of the computer system 800 are executed in a distributed fashion. Thus, the computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as the computer system 800, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for dynamic threat protection are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A method performed by at least one hardware processor for dynamic threat protection comprising:
   dynamically receiving real-time contextual data from a data source associated with a client and a subscriber list, the real-time contextual data including at least two of authentication data, Internet Protocol (IP) data, wireless roaming data, network path data, payment data, account data, virus scan data, session data, client data, client location data, session encryption data, client network data, and client reputation data;
   analyzing the real-time contextual data to determine a security threat score associated with the client, the analyzing including evaluating whether the payment data received from the subscriber list is valid;
   assigning the security threat score to the client using the analysis;
   automatically applying a security policy to the client using the security threat score, the applying including:
   providing a higher quality of service to the client when the payment data is valid; and providing a lower quality of service to the client when the payment data is not valid;
   determining whether the security threat score assigned to the client is above a predetermined threshold threat score; and
   based on the determining, selectively analyzing, contents of data packets associated with the client for adherence to a predetermined standard, the data packets being carried between the client and a server by a data network.

2. The method of claim 1, further comprising providing a quality of service to the client based on the security threat score.

3. The method of claim 1, further comprising:
   based on the determining, selectively applying additional security measures to the client.

4. The method of claim 1, wherein the real-time contextual data is received from the data source via a common event bus.

5. The method of claim 1, wherein the real-time contextual data is received from a third-party system.

6. The method of claim 1, wherein the real-time contextual data is obtained from at least one data protocol of data communications with the client.

7. The method of claim 1, further comprising receiving a service request from the client.

8. The method of claim 7, wherein the service request includes one or more data packets.

9. The method of claim 1, wherein the subscriber list includes: payment data, operating system data, patch level data, and up time data.

10. A dynamic threat protection system comprising:
    at least one processor; and
    a memory communicatively coupled to the at least one processor, the memory storing instructions executable by the at least one processor to perform a method comprising:
    dynamically receiving real-time contextual data from a data source associated with a client and a subscriber list, the real-time contextual data including at least two of authentication data, Internet Protocol (IP) data, wireless roaming data, network path data, payment data, account data, virus scan data, session data, client data, client location data, session encryption data, client network data, and client reputation data;
    analyzing the real-time contextual data to determine a security threat score associated with the client, the analyzing including evaluating whether the payment data received from the subscriber list is valid;
    assigning the security threat score to the client using the analysis; and
    automatically applying a security policy to the client using the security threat score, the applying including:
    providing a higher quality of service to the client when the payment data is valid; and providing a lower quality of service to the client when the payment data is not valid;
    determining whether the security threat score assigned to the client is above a predetermined threshold threat score; and
    based on the determining, selectively analyzing contents of data packets associated with the client for adherence to a predetermined standard, the data packets being carried between the client and a server by a data network.

11. The system of claim 10, wherein a quality of service is provided to the client using the security threat score.

12. The system of claim 10, wherein the method further comprises:
    selectively applying additional security measures to the client using the determination.

13. The system of claim 10, wherein the real-time contextual data is received from the data source via a common event bus.

14. The system of claim 10, wherein the real-time contextual data is received from a third-party system.

15. The system of claim 10, wherein the real-time contextual data is obtained from at least one data protocol of data communications with the client.

16. The system of claim 10, wherein the method further comprises receiving a service request from the client.

17. The system of claim 10, wherein the subscriber list includes: payment data, operating system data, patch level data, and up time data.

18. A non-transitory computer-readable storage medium having embodied thereon a program, the program being executable by at least one processor to perform a method for dynamic threat protection, the method comprising:
    dynamically receiving real-time contextual data from a data source associated with a client and a subscriber list, the real-time contextual data including at least two of authentication data, Internet Protocol (IP) data, wireless roaming data, network path data, payment data, account data, virus scan data, session data, client data, client location data, session encryption data, client network data, and client reputation data;

analyzing the real-time contextual data to determine a security threat score associated with the client, the analyzing including evaluating whether the payment data received from the subscriber list is valid;

assigning the security threat score to the client using the analysis;

automatically applying a security policy to the client using the security threat score, the applying including:

providing a higher quality of service to the client when the payment data is valid; and providing a lower quality of service to the client when the payment data is not valid;

determining whether the security threat score assigned to the client is above a predetermined threshold threat score; and based on the determining, selectively analyzing contents of data packets associated with the client for adherence to a predetermined standard, the data packets being carried between the client and a server by a data network.

\* \* \* \* \*